United States Patent
Horibe

(12) 
(10) Patent No.: US 6,291,903 B1
(45) Date of Patent: Sep. 18, 2001

(54) VEHICULAR ELECTRIC POWER GENERATION APPARATUS AND METHOD

(75) Inventor: Mitsutoshi Horibe, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/344,486

(22) Filed: Jun. 25, 1999

(30) Foreign Application Priority Data

Aug. 4, 1998 (JP) .................................................. 10-220751

(51) Int. Cl.$^7$ ................. F02N 11/06; H02P 9/04
(52) U.S. Cl. ............ 290/40 A; 290/40 R; 290/41; 290/40 B; 290/40 C; 290/40 D; 290/40 F; 290/4 R
(58) Field of Search .............. 290/40 A–40 G, 290/40 S–40 F; 180/16 J, 65 S, 65 D; 372/28

(56) References Cited

U.S. PATENT DOCUMENTS

| | | |
|---|---|---|
| 4,739,243 | 4/1988 | Iwatani et al. . |
| 5,076,230 | 12/1991 | Ohkumo . |
| 5,117,682 | 6/1992 | Amano . |
| 5,144,220 * | 9/1992 | Iwatani et al. ........................ 322/28 |
| 5,262,711 * | 11/1993 | Mori et al. ............................ 322/28 |
| 5,512,813 * | 4/1996 | Uchinami ............................... 322/28 |
| 5,735,770 * | 4/1998 | Omote et al. ............................ 477/5 |

FOREIGN PATENT DOCUMENTS 10-4698    1/1998    (JP) .

OTHER PUBLICATIONS

Patent Abstracts of Japan, vol. 011, No. 312 (E–548), Oct. 12, 1987 & JP 62 104500 A(Mitsubishi Electric Corp), May 14, 1987.
Patent Abstracts of Japan, vol. 1998, No. 05, Apr. 30, 1998 & JP 10 004698 A (Toyota Motor Corp), Jan. 6, 1998.

* cited by examiner

Primary Examiner—Elvin Enad
(74) Attorney, Agent, or Firm—Pillsbury Winthrop LLP

(57) ABSTRACT

In a vehicular electric power generation apparatus having an a.c. generator and an engine, a rotation speed of the a.c. generator at the idling rotation operation of the engine is set to be higher than a rotation speed, at which the driving torque of the a.c. generator becomes a maximum. Thus, the rotation speed of the a.c. generator does not change through the rotation speed at which the driving torque of the vehicle a.c. generator becomes a maximum, even when the rotation speed of the engine is raised high for running of a vehicle. Thus, changes in the load applied to the engine can be restricted.

3 Claims, 2 Drawing Sheets

VEHICULAR ELECTRIC POWER GENERATION APPARATUS AND METHOD

CROSS REFERENCE TO RELATED APPLICATION

This application relates to and incorporates herein by reference Japanese patent Application No. 10-220751 filed on Aug. 4, 1998.

BACKGROUND OF THE INVENTION

1. Field of the Invention

The present invention relates to a vehicular electric power generation apparatus and method, which may be used in passenger vehicles, truck vehicles and the like.

2. Description of Related Art

A recent trend involves electronically controlling an idling rotation speed of a vehicle engine. In this instance, the idling rotation speed is determined based on engine temperature the magnitude of the electric load, on/off status of an air conditioner and the like. The engine rotation is stabilized to a target idling rotation speed by feeding back the actual rotation speed of the engine during engine idling operation. The idling rotation speed of the engine is lowered to meet various social requirements, such as fuel economy, lower noise during engine idling, and environmental protection.

It became a recent problem that if the engine idling rotation speed does not stabilize, a hunting occurs, at which to higher and lower rotation speeds. The electric power output of a vehicular alternating current (a.c.) generator driven by the engine generally increases up to a certain rotation speed with an increase in its rotation speed and saturates after reaching the certain rotation speed.

Further, the driving torque of the a.c. generator may be considered as the output per rotation of the a.c. generator. Thus, the relation between the rotation speed and the driving torque is in a monotonic increase until the output saturates relative to the rotation speed, and is in a monotonic decrease after the output saturation. As a result, as shown in FIG. 3, the a.c. generator generally has a maximum driving torque Tp at a rotation speed No. The maximum driving torque changes sharply at around the rotation speed No. The increase and decrease in the engine rotation speed is controlled by an idling speed control apparatus as described above, even in the range of engine idling operation in which the output torque of the engine is not sufficient. For this reason, when the rotation speed of the a.c. generator at the time of engine idling rotation and the rotation speed No, at which the a.c. generator requires a maximum driving torque Tp, generally coincide at the rotation speed No, a response delay of control or the like causes a hunting in which the engine idling rotation speed falls far below and rises far above the rotation speed No at which the driving torque Tp of the a.c. generator reaches a maximum.

When the hunting occurs, sound of changes in the rotation speed of the engine and in rotation speeds of a number of devices driven by the engine become noisy, and changes in vibration caused by the changes in the rotation speed becomes sensible. Thus, users of vehicles are likely to feel uncomfortable. This will result in an unacceptable problem in recent passenger compartments, which have increased quietness.

It is therefore desired in view of the foregoing problems to provide a vehicular a.c. generator, which requires a lower driving toque and does not have sharp maximum driving torque characteristics.

For decreasing the driving torque, reduction in inertial moment of a rotary body by down-sizing, improvement in efficiency by improving cooling and the like have been attained. However, those are not effective to restrict hunting of rotation speed.

Further, as disclosed in JP-B2-6-38720, it is known to regulate an energization current under a cold state for restricting the cold state driving torque to the same level as the hot state driving torque, because the a.c. generator has a larger driving torque in the cold state than in the hot state. However, this method is still incapable of suppressing occurrence of hunting, because the a.c. generator requires the maximum driving torque in the hot state.

Further, as disclosed in JP-A-10-4698, although it is proposed to flatten the maximum driving torque characteristics by restricting an electric power generation output at around the maximum driving torque, the generated power output is decreased.

SUMMARY OF THE INVENTION

It is therefore an object of the present invention to reduce chances where a vehicular a.c. generator operates at a rotation speed at which a driving torque of the a.c. generator becomes a maximum.

It is another object of the present invention to restrict hunting by driving a vehicular a.c. generator at rotation speeds other than a rotation speed at which a driving torque of the a.c. generator becomes a maximum.

According to the present invention, a rotation speed of a vehicular a.c. generator at the time of idling rotation speed of an internal combustion engine is set to be higher than a rotation speed at which a driving torque of the a.c. generator becomes a maximum. Thus, even when the rotation speed of the internal combustion engine is raised for vehicle running from the idling rotation speed, the rotation speed does not change through the rotation speed at which the driving torque of the a.c. generator becomes a maximum. As a result, changes of the load applied from the a.c. generator to the internal combustion engine can be reduced.

According to the present invention, a range of rotation speed of a vehicular a.c. generator is set to a range of rotation speed in which the driving torque of the a.c. generator does not become a maximum. Thus, the rotation speed of the internal combustion engine does not become equal to the rotation speed at which the driving torque of the a.c. generator becomes a maximum.

Preferably, a lowest rotation speed in the range of rotation speed of the a.c. generator is higher more than 100 rpm than the rotation speed at which the driving torque of the a.c. generator becomes a maximum in a maximum output condition under a cold state. Thus, even when the idling rotation speed of the internal combustion engine varies, the change in the load applied to the internal combustion engine is restricted because the rotation speed at the maximum of the driving torque is more than 100 rpm lower. In addition, the rotation speed at which the driving torque of the a.c. generator in hot condition becomes a maximum is lower than the rotation speed for the maximum driving torque in the cold condition, and the driving torque in the partial output condition is lower than the driving torque in the maximum output condition. Therefore, the maximum driving torque of the a.c. generator can be avoided by setting it as above in the cold maximum output condition. It is also possible to combine with a construction of an electric power generation control apparatus, which restricts the output in the cold condition to that in the hot condition. In this instance, as the maximum driving torque of the a.c. generator can be avoided, the change in the load applied to the internal combustion engine at around the maximum driving torque can be restricted.

BRIEF DESCRIPTION OF THE DRAWINGS

Other objects, features and advantages of the present invention will become more apparent from the following detailed description mad with reference to the accompanying drawings.

In the drawings.

DETAILED DESCRIPTION OF THE PREFERRED EMBODIMENT

A vehicular a.c. generator according to the present invention is described below with reference to an embodiment shown in FIGS. 1 and 2.

Figure 1:
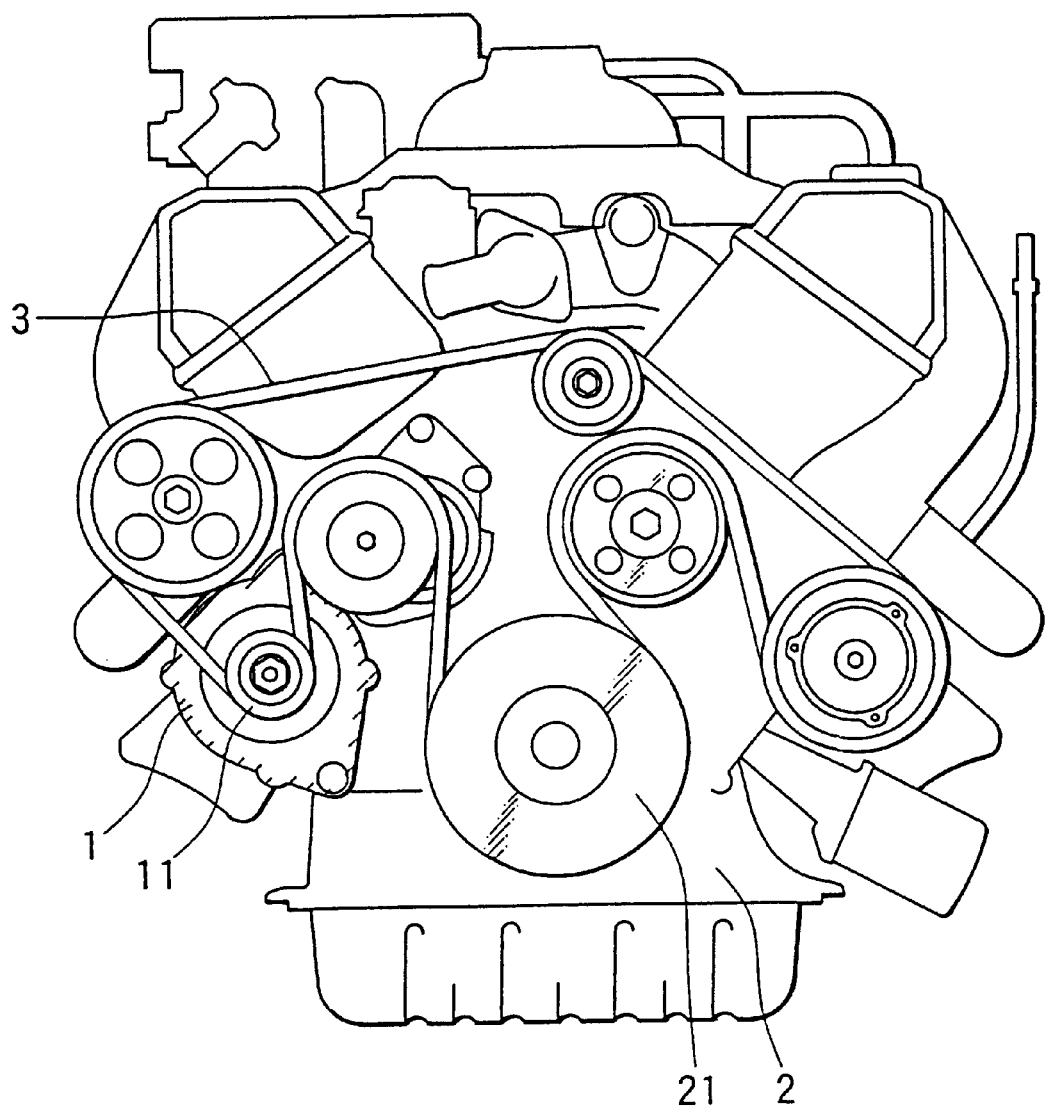
FIG. 1 is a plan view showing an electric power generation apparatus having a vehicular a.c. generator on an engine according to an embodiment of the present invention.

A vehicular electric power generation apparatus includes, as shown in FIG. 1, an alternating current (a.c.) generator 1 mounted on an internal combustion engine 2, so that it may be driven by the internal combustion engine 2 via a belt 3. The engine 2 has a crank pulley 21 mounted on a crankshaft (not shown) of the engine 2, which is used as a driving source for vehicle running. The a.c. generator 1 has a pulley 11. The belt 3 is wound around those pulleys, so that rotation of the engine 2 is transmitted through the belt 3 to the a.c. generator 1 as well as to a plurality of other auxiliary rotary devices such as a compressor and water pump for an air conditioner. This kind of rotation transmitting device is a serpentine type belt driving device.

Figure 2:
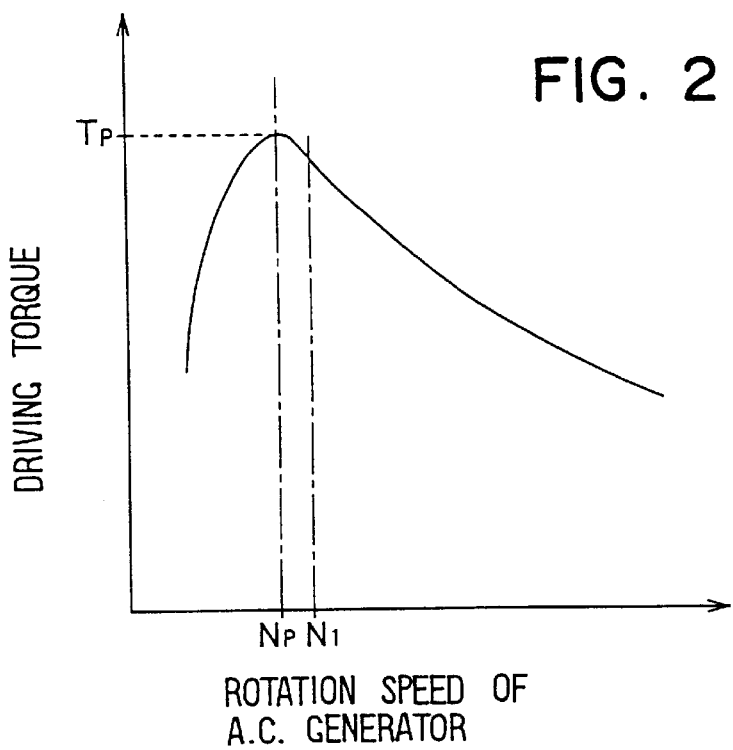
FIG. 2 is a graph showing a driving torque characteristics of the a.c. generator used in the embodiment shown in FIG. 1.
Figure 3:
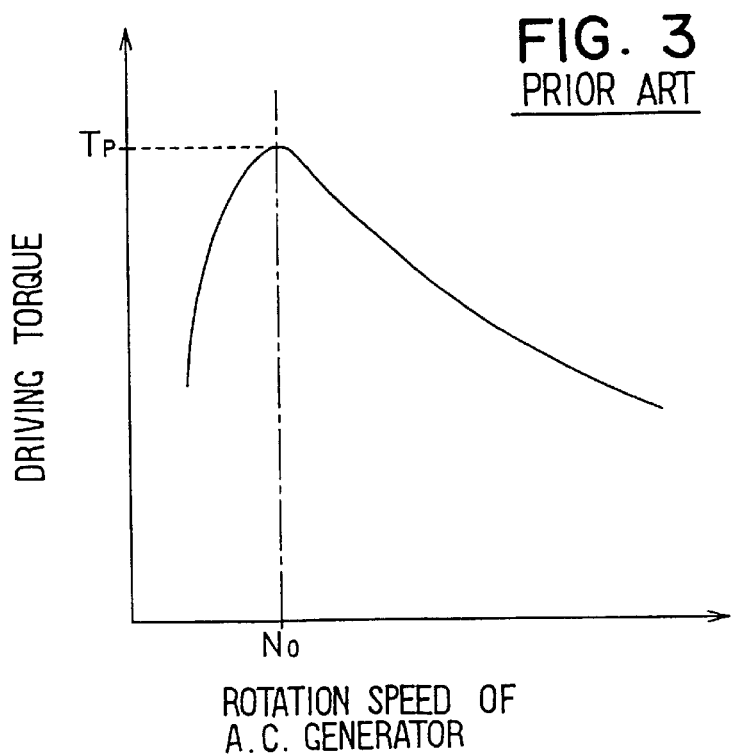
FIG. 3 is a graph showing a driving torque characteristics of a conventional a.c. generator.

The a.c. generator 1 has driving torque characteristics in the cold maximum output condition as shown in FIG. 2. In FIG. 2, N1 indicates a rotation speed of the a.c. generator 1 at the time of idling of the engine 2, and the a.c. generator 1 is used normally in the range of rotation speed above N1 in this embodiment. Here, the normally used rotation speed range of the engine 2 corresponds to the normally used rotation speed range of the a.c. generator 1.

In this embodiment, the diameters of the crank pulley 21 of the engine 2 and the pulley 11 of the a.c. generator 1 are 190 mm and 50 mm, respectively, so that the pulley ratio is 3.8. As the idling rotation speed as the lowest rotation speed of the engine 2 is 600 rpm in this embodiment, the rotation speed N1 of the a.c. generator 1 at the time of engine idling is 2280 rpm. That is, the rotation speed N1 is set to be 180 rpm higher than 2100 rpm, which is the rotation speed Np at which the driving torque becomes a maximum (peak) Tp. Although this idling rotation speed of the engine 2 may be raised in response to air conditioner operation and the like, it is set to be 600 rpm at the lowest. Thus, the rotation speed of the a.c. generator 1 rises through the rotation speed Np, at which the a.c. generator 1 requires the maximum driving torque Tp, only temporarily at the time of starting the engine 2, and is not used in the normal operation of the engine 2 and the a.c. generator 1.

For this reason, even when the rotation speed of the a.c. generator 1 changes over a wide range during normal operation of the engine 2, the driving torque of the a.c. generator 1 does not become the maximum during normal operation of the engine 2. Thus, changes in the inclination of torque increase and torque decrease around the maximum driving torque Tp can be avoided. As a result, a uniform characteristics can be provided, in which the driving torque decreases as the rotation speed increases during the normal operation of the engine 2. Thus, when the idling rotation speed of the engine 2 is controlled to a fixed speed by an idling rotation speed control apparatus in the known manner, its control stability is improved and a hunting of rotation speed is restricted.

Further, as the rotation speed Np at which the driving torque becomes the maximum is set to be lower than the lowest rotation speed N1 which corresponds to the idling speed of the engine 2, the maximum driving torque can be avoided even when the idling rotation speed is changed to a higher rotation speed for driving an air conditioner.

In setting the pulley ratio, the diameters of the pulley 21 and the pulley 11 are set in consideration of the angle of winding the driving belt 3. For instance, it is preferred to construct the pulley 21 large as much as possible and the pulley 11 relatively small.

The pulley ratio between the a.c. generator 1 and the engine 2 is set to the fixed ratio in the first embodiment. However, the driving torque characteristics may be changed by increasing the number of turns of the stator winding of the a.c. generator 1, so that the rotation speed Np at which the driving torque becomes a maximum may be set to be lower than the lowest rotation speed N1 of the a.c. generator 1.

Further, a control apparatus for controlling a field current which restricts a maximum of the driving toque may be used jointly with the above power generation apparatus. In this instance, any disadvantage which would be caused by the maximum driving torque can be eliminated, even when the field current restriction control fails.

In addition, the belt driving system shown in FIG. 1 may be replaced with a driving system which is a combination of a crank pulley having multi-stage grooves and a plurality of belts. Still further, a rotation transmitting device such as a gear driving device may be used.

The above embodiment may be modified further without departing from the spirit of the present invention.

What is claimed is:

1. A vehicular electric power generation apparatus comprising an a.c. generator, the a.c. generator producing a maximum torque at which an output power of the a.c. generator is highest at a maximum torque rotation speed and being configured to be driven normally in a range of rotation speeds, said range of speeds being higher than said maximum torque rotation speed; and an internal combustion engine configured to drive the a.c. generator;

wherein an idling rotation speed of the a.c. generator is set higher than the maximum torque rotation speed, the idling rotation speed occurring during an idling rotation operation of the internal combustion engine; and wherein a lowest rotation speed within the range of rotation speeds is set more than 100 revolutions per minute higher than the maximum torque rotation speed during a cold operating state.

2. A vehicular electric power generation method comprising:

driving an a.c. generator using an engine and a rotation transmitting device, the a.c. generator being driven to produce a maximum torque at one rotation speed at which an output power of the a.c. generator is highest; and maintaining a rotation operation speed of the engine after starting the engine so that the a.c. generator is driven at another rotation speed higher than the one rotation speed;

wherein the other rotation speed corresponds to an idling rotation speed of the engine, the idling rotation speed being a lowest speed among normal rotation speeds of the engine; and wherein the other rotation speed is more than 100 revolutions per minute higher than the one rotation speed.

3. A vehicular electric power generation apparatus comprising:

an a.c. generator configured to produce a maximum torque at which an output power of the a.c. generator is highest at a maximum torque rotation speed, said a.c. generator being configured to be driven normally in a range of rotation speeds, said range of rotation speeds being faster than said maximum torque rotation speed, a driving torque of said a.c. generator during said maximum torque rotation speed being less than a driving torque of said a.c. generator rotated in said range of rotation speeds; and an internal combustion engine configured to drive the a.c. generator;

wherein an idling rotation speed of the a.c. generator is set higher than the maximum torque rotation speed, the idling rotation speed occurring during an idling rotation operation of the internal combustion engine;

wherein a lowest rotation speed within the range of rotation speeds is set more than 100 revolutions per minute higher than the maximum torque rotation speed during a cold operating state; and wherein said a.c. generator is rotated within said range of rotation speeds by said engine when said engine rotates at speeds greater than or equal to said idling rotation speed, said a.c. generator being rotated at said maximum torque rotation speed by said engine when said engine rotates at a speed less than said idling rotation speed.

* * * * *